United States Patent
Day et al.

(10) Patent No.: US 6,820,143 B2
(45) Date of Patent: Nov. 16, 2004

(54) ON-CHIP DATA TRANSFER IN MULTI-PROCESSOR SYSTEM

(75) Inventors: Michael Norman Day, Round Rock, TX (US); Charles Ray Johns, Austin, TX (US); James Allan Kahle, Austin, TX (US); Peichun Peter Liu, Austin, TX (US); David Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/322,127

(22) Filed: Dec. 17, 2002

(65) Prior Publication Data

US 2004/0117520 A1 Jun. 17, 2004

(51) Int. Cl.$^7$ .............................................. G06F 13/28
(52) U.S. Cl. .............................. 710/27; 712/32; 712/33
(58) Field of Search .......................... 710/22, 23, 24, 710/25, 26, 27, 28, 36; 712/32, 33, 28; 711/141, 118

(56) References Cited

U.S. PATENT DOCUMENTS 4,814,977 A * 3/1989 Buonomo et al. ............. 710/3

2003/0225979 A1 * 12/2003 Glasco ........................ 711/141

FOREIGN PATENT DOCUMENTS

EP          0318702 A2 *  6/1989   ............. G06F/9/38

OTHER PUBLICATIONS

Patterson and Hennessy; Computer Organization & Design, The Hardware/Software Interface; 1998; Morgan Kaufmann Publishers; Second Edition, pp. 540–544.*

* cited by examiner

Primary Examiner—Jeffrey Gaffin
Assistant Examiner—Alan S Chen
(74) Attorney, Agent, or Firm—Carr LLP; Robert M. Carwell

(57) ABSTRACT

A system and method are provided for improving performance of a computer system by providing a direct data transfer between different processors. The system includes a first and second processor. The first processor is in need of data. The system also includes a directory in communication with the first processor. The directory receives a data request for the data and contains information as to where the data is stored. A cache is coupled to the second processor. An internal bus is coupled between the first processor and the cache to transfer the data from the cache to the first processor when the data is found to be stored in the cache.

24 Claims, 2 Drawing Sheets

ON-CHIP DATA TRANSFER IN MULTI-PROCESSOR SYSTEM

BACKGROUND OF THE INVENTION

1. Field of the Invention

The invention relates generally to a memory management scheme and, more particularly, to using a cache memory to transfer data via an on-chip internal bus.

2. Description of the Related Art

In a large configuration computer system, applications data are transferred from a system memory to processors, and then computed data will be transferred back and forth to the system memory before the same set of computed data can be reused by other processors. The time consumed by transferring data back and forth to the system memory becomes a big issue for system performance. If the system design is not well tuned, the processor will spend most of the time waiting for data availability.

In a large system configuration, there is a hierarchy of different memories, such as a level one (L1) cache, a level two (L2) cache, a level three (L3) cache, and a system memory. An L1 cache is closest to the processor and usually not shared with other processors in a multi-processor system. Typically, an L1 cache resides within a processor, whereas an L2 cache resides outside a processor. Two or more processors may share an L2 cache; however, an L2 cache is usually coupled to a different processor. An L3 cache is further away from the processor than an L2 cache and is closer to the processor than the system memory. These caches will keep data close to the processors, and the data will be reused with a much better latency.

In a multi-processor system, however, a cache may contain data when a processor not directly coupled to the cache requests the data. For example, a first processor may request data that is stored in an L2 cache coupled to a second processor but not directly coupled to the first processor. In this example, the requested data in the L2 cache cannot be transmitted to the first processor directly. The requested data first has to be transmitted to a system memory (or an L3 cache) and then to the first processor. This definitely affects the performance of the multi-processor system, because the first processor has to wait for the requested data to be transferred first from the cache to the system memory (or the L3 cache) and then from the system memory to the first processor.

Therefore, a need exists for a system and method for improving performance of a computer system by directly transferring data from a cache to whichever processor requests the data.

SUMMARY OF THE INVENTION

The present invention provides a system and method for improving performance of a computer system by providing a direct data transfer between different processors. The system includes a first and second processor. The first processor is in need of data. The system also includes a directory in communication with the first processor. The directory receives a data request for the data and contains information as to where the data is stored. A cache is coupled to the second processor. An internal bus is coupled between the first processor and the cache to transfer the data from the cache to the first processor when the data is found to be stored in the cache.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
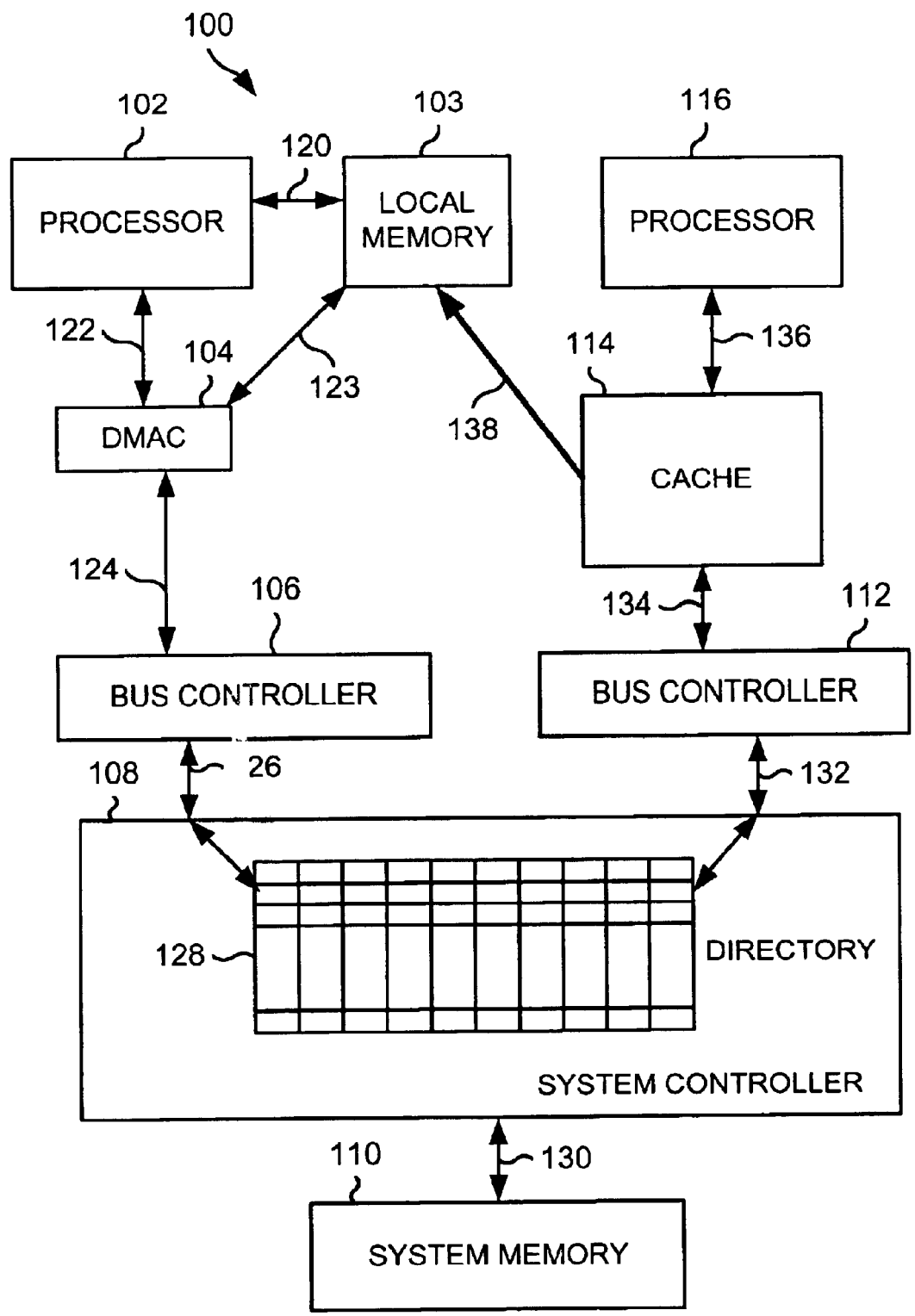
FIG. 1 is a block diagram illustrating a computer system having an internal bus for a data transfer between a first processor and a cache coupled to a second processor.

Referring to FIG. 1 of the drawings, the reference numeral 100 generally designates a computer system. The computer system 100 comprises a first processor 102, a local memory 103, a direct memory access controller (DMAC) 104, a first bus controller 106, a system controller 108, a system memory 110, a second bus controller 112, a cache 114, and a second processor 116.

The first processor 102 is coupled to the local memory 103 via a connection 120. The first processor 102 is also coupled to the DMAC 104 via a connection 122. The DMAC is coupled to the local memory 103 via a connection 123. The DMAC 104 is also coupled to the first bus controller 106 via a connection 124. The first bus controller 106 is coupled to the system controller 108 via a connection 126. The system controller 108 stores a directory 128. The system controller 108 is coupled to the system memory 110 via a connection 130. The system controller 108 is also coupled to the second bus controller 112 via a connection 132. The second bus controller 112 is coupled to the cache 114 via a connection 134. The cache 114 is coupled to the second processor 116 via a connection 136. The cache 114 is also coupled to the local memory 103 via a connection 138. Preferably, the connection 138 comprises an on-chip internal bus.

The first processor 102 sets up a direct memory access (DMA) read transfer from the system memory 110 to the local memory 103. The DMAC 104 issues a data request for data. The DMAC 104 transmits the data request to the first bus controller 106 via the connection 124. The first bus controller 106 then transmits the data request to the system controller 108 via the connection 126. The directory 128 contains information as to where the data is stored.

If the data is found to be stored in the cache 114, then the system controller 108 transmits the data request to the second bus controller 112 via the connection 132. The second bus controller 112 then transmits the data request to the cache 114 via the connection 134. The data is retrieved from the cache 114 and directly transmitted to the local memory 103 via the connection 138. Preferably, a cache controller (not shown) may be included in the cache 114 to retrieve the data from the cache 114 and transmit the data to the local memory 103. Alternatively, the local memory 103 may be included in the first processor 102 or replaced with a cache (not shown) in the first processor 102 such that the cache 114 is directly coupled to the first processor 102 via the connection 138.

If the data is found to be stored in the system memory 110, the data stored in the system memory 110 is retrieved from the system memory 110 and transmitted to the system controller 108 via the connection 130. The data is then transmitted from the system controller 108 to the first bus controller 106 via the connection 126. The first bus controller 106 then transmits the data to the DMAC 104 via the connection 124. The DMAC 104 then transmits the data to the local memory 104 via the connection 123.

Preferably, the second processor 116 includes a level 1 (L1) cache (not shown). In that case, the cache 114 is a level 2 (L2) cache, whereas the directory 128 is stored in a level 3 (L3) cache (not shown).

Preferably, the first processor 102 is a special processor, whereas the second processor 116 is a general-purpose processor. Also, the computer system 100 may be generalized to have a plurality of general-purpose processors. In that case, an additional cache (not shown) and an additional bus controller (not shown) may be coupled between each additional processor (not shown) and the system controller 108 in a manner similar to the connection between the second processor 116 and the system controller 108.

Figure 2:
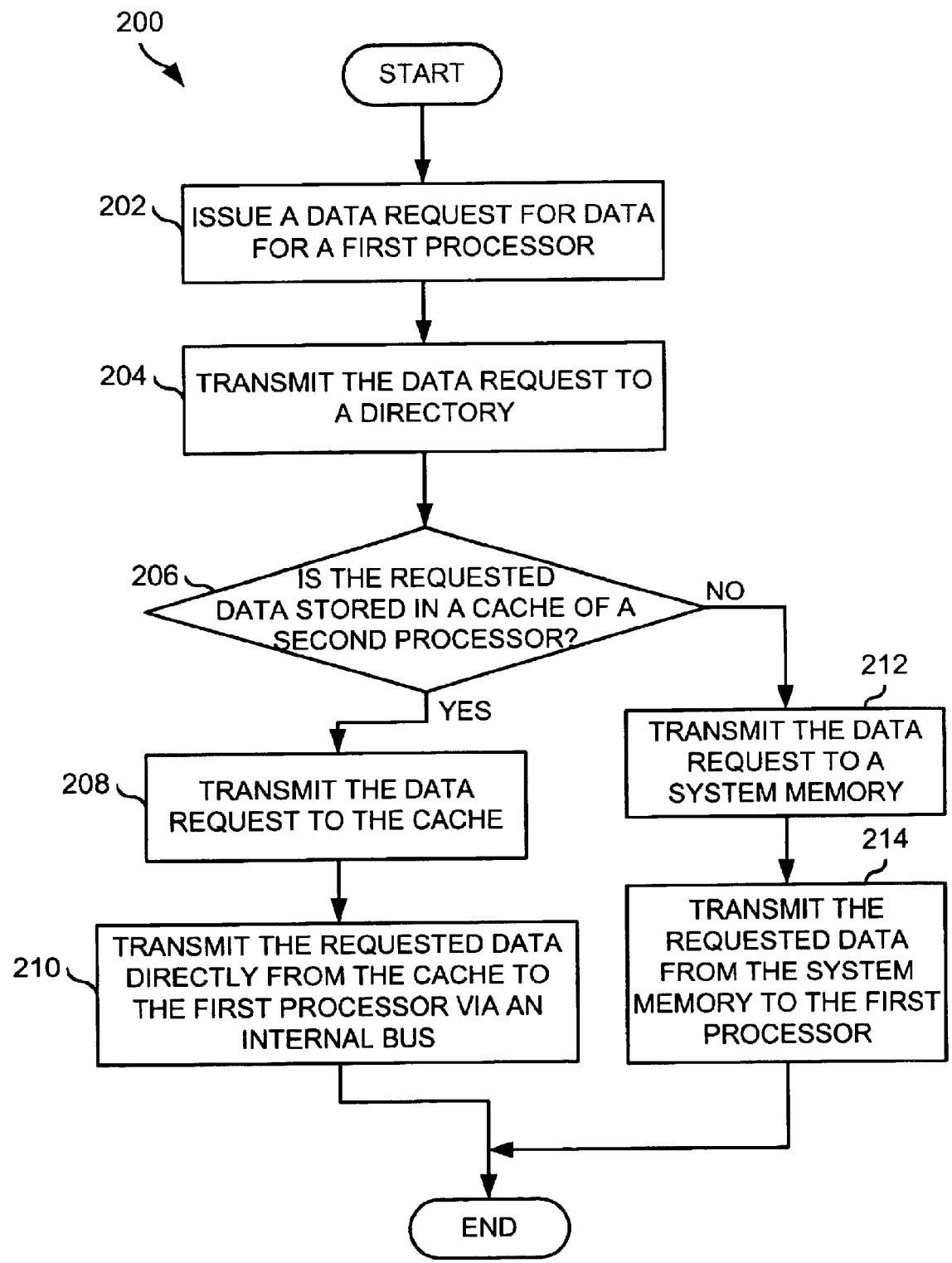
FIG. 2 is a flow diagram illustrating the operation of the computer system of FIG. 1.

In FIG. 2, a flow diagram 200 is shown to illustrate the operation of the computer system 100 of FIG. 1. In step 202, a data request for data is issued for a first processor. Preferably, the DMAC 104 issues the data request for the first processor 102.

In step 204, the data request is transmitted to a directory. Preferably, the DMAC 104 transmits the data request to the system controller 108 through the first bus controller 106. In this case, the data request is transmitted to the directory 128 residing in the system controller 108.

In step 206, it is determined whether the requested data is stored in a cache of a second processor. Preferably, the directory 128 determines whether the requested data is stored in the cache 114 of the second processor 116.

If it is determined in step 206 that the requested data is stored in a cache of a second processor, the data request is transmitted to the cache in step 208. Preferably, the directory 128 transmits the data request to the cache 114 through the second bus controller 112. In step 210, the requested data is transmitted directly from the cache to the first processor via an internal bus. Preferably, the cache 114 transmits the requested data to the local memory 103 of the first processor 102 via the connection 138.

If it is determined in step 206 that the requested data is not stored in a cache of a second processor, the data request is transmitted to a system memory in step 212. In step 214, the requested data is then transmitted from the system memory to the first processor. Preferably, the requested data is transmitted from the system memory 110 to the first processor 102 via the system controller 108, the first bus controller 106, and the DMAC 104.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A computer system comprising:
    a plurality of memory devices of at least three different functional species of storage media;
    a first processor in need of data;
    a second processor;
    a directory in communication with at least the first processor and in communication with the plurality of memory devices, the directory receiving a data request for the data and containing information as to where the data is stored;
    a cache coupled to the second processor, wherein the cache is at least one variety of memory device of the plurality of memory devices; and
    an internal bus coupled between the first processor and the cache to transfer the data from the cache to the first processor when the data is found to be stored in the cache.

2. The computer system of claim 1, further comprising a system controller for storing the directory.

3. The computer system of claim 2, wherein the cache is a level two (L2) cache.

4. The computer system of claim 3, wherein the system controller includes a level three (L3) cache for storing the directory.

5. The computer system of claim 2, further comprising a direct memory access controller (DMAC) coupled to the first processor for issuing the data request on behalf of the first processor.

6. The computer system of claim 5, further comprising:
    a first bus controller coupled between the DMAC and the system controller for transmitting the data request from the DMAC to the directory; and
    a second bus controller coupled between the cache and the system controller for transmitting the data request from the directory to the cache when the data is found to be stored in the cache.

7. The computer system of claim 1, further comprising a system memory coupled to the directory.

8. The computer system of claim 7, wherein the data request is transmitted to the system memory when the data is found to be stored in the system memory.

9. The computer system of claim 8, wherein the data is transmitted from the system memory to the first processor.

10. The computer system of claim 1, further comprising a direct memory access controller (DMAC) coupled to the first processor for issuing the data request on behalf of the first processor.

11. The computer system of claim 10, further comprising:
    a first bus controller coupled between the DMAC and the directory for transmitting the data request from the DMAC to the directory; and
    a second bus controller coupled between the cache and the directory for transmitting the data request from the directory to the cache when the data is found to be stored in the cache.

12. The computer system of claim 1, further comprising a local memory coupled to the first processor, the local memory coupled to the cache via the internal bus.

13. A method for improving performance of a computer system by providing a direct data transfer between different processors, the method comprising the steps of:
    issuing a data request for data for a first processor;
    transmitting the data request to a directory, wherein the directory at least contains memory locations for the data, and wherein the memory locations are addresses for a plurality of memory devices of at least three different functional species of storage media;

determining whether the data is stored in a cache of a second processor;

upon a determination that the data is stored in the cache of the second processor, transmitting the data request to the cache; and transmitting the data directly from the cache to the first processor via an internal bus.

14. The method of claim 13, further comprising the steps of:

upon a determination that the data is not stored in the cache of the second processor, transmitting the data request to a system memory; and transmitting the data from the system memory to the first processor.

15. The method of claim 13, wherein the step of transmitting the data request to a directory comprises the steps of:

transmitting the data request from a direct memory access controller (DMAC) for the first processor to a first bus controller; and transmitting the data request from the first bus controller to the directory.

16. The method of claim 13, wherein the step of transmitting the data request to the cache comprises the steps of:

transmitting the data request from the directory to a second bus controller; and transmitting the data request from the second bus controller to the cache.

17. A computer system for improving performance of a computer system by providing a direct data transfer between different processors, the computer system comprising:

means for issuing a data request for data for a first processor;

means for transmitting the data request to a directory, wherein the directory at least contains memory locations for the data, and wherein the memory locations are addresses for a plurality of memory devices of at least three different functional species of storage media;

means for determining whether the data is stored in a cache of a second processor;

means for, upon a determination that the data is stored in the cache of the second processor, transmitting the data request to the cache; and means for transmitting the data directly from the cache to the first processor via an internal bus.

18. The computer system of claim 17, further comprising:

means for, upon a determination that the data is not stored in the cache of the second processor, transmitting the data request to a system memory; and means for transmitting the data from the system memory to the first processor.

19. The computer system of claim 17, wherein the means for transmitting the data request to a directory comprises:

means for transmitting the data request from a direct memory access controller (DMAC) for the first processor to a first bus controller; and means for transmitting the data request from the first bus controller to the directory.

20. The computer system of claim 17, wherein the means for transmitting the data request to the cache comprises:

means for transmitting the data request from the directory to a second bus controller; and means for transmitting the data request from the second bus controller to the cache.

21. A computer program product for improving performance of a computer system by providing a direct data transfer between different processors, the computer program product having a medium with a computer program embodied thereon, the computer program comprising:

computer program code for issuing a data request for data for a first processor;

computer program code for transmitting the data request to a directory, wherein the directory at least contains memory locations for the data, and wherein the memory locations are addresses for a plurality of memory devices of at least three different functional species of storage media;

computer program code for determining whether the data is stored in a cache of a second processor;

computer program code for, upon a determination that the data is stored in the cache of the second processor, transmitting the data request to the cache; and computer program code for transmitting the data directly from the cache to the first processor via an internal bus.

22. The computer program product of claim 21, the computer program further comprising:

computer program code for, upon a determination that the data is not stored in the cache of the second processor, transmitting the data request to a system memory; and computer program code for transmitting the data from the system memory to the first processor.

23. The computer program product of claim 21, wherein the computer program code for transmitting the data request to a directory comprises:

computer program code for transmitting the data request from a direct memory access controller (DMAC) for the first processor to a first bus controller; and computer program code for transmitting the data request from the first bus controller to the directory.

24. The computer program product of claim 21, wherein the computer program code for transmitting the data request to the cache comprises:

computer program code for transmitting the data request from the directory to a second bus controller; and computer program code for transmitting the data request from the second bus controller to the cache.

* * * * *